(12) United States Patent
Ukai

(10) Patent No.: US 11,965,536 B2
(45) Date of Patent: Apr. 23, 2024

(54) CLIP

(71) Applicant: DAIWA KASEI KOGYO KABUSHIKI KAISHA, Okazaki (JP)

(72) Inventor: Junya Ukai, Okazaki (JP)

(73) Assignee: DAIWA KASEI KOGYO KABUSHIKI KAISHA, Okazaki (JP)

(*) Notice: Subject to any disclaimer, the term of this patent is extended or adjusted under 35 U.S.C. 154(b) by 0 days.

(21) Appl. No.: 17/578,214

(22) Filed: Jan. 18, 2022

(65) Prior Publication Data

US 2022/0235808 A1 Jul. 28, 2022

(30) Foreign Application Priority Data

Jan. 22, 2021 (JP) ................... 2021-008556

(51) Int. Cl.
*F16B 21/07* (2006.01)
*B60Q 3/51* (2017.01)

(52) U.S. Cl.
CPC .............. *F16B 21/075* (2013.01); *B60Q 3/51* (2017.02)

(58) Field of Classification Search
CPC ................................ F16B 21/075; B60Q 3/51
See application file for complete search history.

(56) References Cited

U.S. PATENT DOCUMENTS

| | | | | |
|---|---|---|---|---|
| 4,920,618 A * | 5/1990 | Iguchi | ................... | F16B 13/061 24/297 |
| 6,019,487 A * | 2/2000 | Fornell | ................... | B60Q 3/30 248/27.1 |
| 7,351,001 B1 * | 4/2008 | O'Brien | ................ | F16B 5/0664 29/748 |
| 8,079,727 B2 * | 12/2011 | Liang | ...................... | F21V 21/04 362/147 |
| 8,801,243 B2 * | 8/2014 | Nagai | ...................... | B60Q 3/51 362/490 |
| 9,140,293 B2 * | 9/2015 | Schilz | ................... | F16B 21/088 |
| 2002/0126495 A1 * | 9/2002 | Nagata | ..................... | B60Q 3/51 362/490 |
| 2005/0083700 A1 * | 4/2005 | Okabe | ...................... | B60Q 3/51 362/362 |
| 2011/0280027 A1 * | 11/2011 | Takasaki | .................. | B60Q 3/51 362/382 |
| 2011/0310632 A1 * | 12/2011 | Chiba | ...................... | B60Q 3/51 362/549 |

(Continued)

FOREIGN PATENT DOCUMENTS

JP 5524477 B2 6/2014

*Primary Examiner* — Robert Sandy
*Assistant Examiner* — Rowland Do
(74) *Attorney, Agent, or Firm* — Diamantis Law, PLLC

(57) ABSTRACT

A clip for attaching an attaching article to an object member may include an engagement claw configured to engage an attaching hole formed in the object member. The clip may also include a slide body configured to retainably hold the engagement claw on the attaching article and configured to slide the engagement claw with respect to the attaching article so as to project and retract the engagement claw. The clip may also include an elastic body configured to apply a restoring force to the engagement claw when the engagement claw slides from a projected state to a retracted state with respect to the attaching article, so as to provide a biasing force to return the engagement claw toward the projected state.

2 Claims, 17 Drawing Sheets

(56) References Cited

U.S. PATENT DOCUMENTS

| | | | | |
|---|---|---|---|---|
| 2013/0058119 A1* | 3/2013 | Chiba | ............... | B60Q 3/51 |
| | | | | 362/520 |
| 2013/0335991 A1* | 12/2013 | Proepper | ............ | F21S 43/51 |
| | | | | 362/549 |
| 2018/0334095 A1* | 11/2018 | Ohtsuka | ............ | B60Q 3/60 |
| 2021/0291728 A1* | 9/2021 | Ohtsuka | ............ | B60Q 3/60 |
| 2021/0293398 A1* | 9/2021 | Ohtsuka | ............ | B60Q 3/51 |

\* cited by examiner

CLIP

CROSS-REFERENCE TO RELATED APPLICATIONS

This application claims priority to Japanese Patent Application serial number 2021-008556, filed Jan. 22, 2021, the contents of which are incorporated herein by reference for all purposes.

BACKGROUND

The present disclosure relates to a clip. More specifically, the present disclosure relates to a clip for attaching an attaching article or component (e.g., an automobile interior part such as a lamp unit) to an object member (e.g., a ceiling panel of a vehicle), and relates to an attachment structure of the attaching article to be attached to the object member.

A known clip may be configured to attach a lamp unit (an attaching article) to a ceiling panel of a vehicle (an object member). In particular, the clip may include a vertically elongated elastic base portion connected to a front end portion of a substrate (bezel) of the lamp unit at a proximal end thereof. The clip may also include an engagement (head) portion flexibly connected to a distal end of the base element via an arcuate neck portion. The clip may be formed into a U-shape as a whole. The engagement portion may have an inclined surface and a hook-shaped engagement surface continuous with the inclined surface.

In order to attach the lamp unit to the ceiling panel, first, a rear end portion of the lamp unit may be hooked on a periphery of an attaching hole formed in the ceiling panel. Thereafter, the lamp unit may be rotated about the rear end portion thereof, so as to be pressed into the attaching hole. As a result, the clip may be introduced into the attaching hole while the base portion is flexed backward (inward) due to the inclined surface of the engagement portion contacting the periphery of the attaching hole. When the engagement portion clears or passes through the periphery of the attaching hole, the base portion may be flexed or restored forward (outward), so that the engagement surface of the engagement portion engages the periphery of the attaching hole. Thus, the lamp unit may be attached to the ceiling panel by the clip.

Generally speaking, in order to fit the engagement surface of the engagement portion in attaching holes of various sizes (i.e., in order to absorb variations in size of the attaching hole), it is necessary to increase a flexing range of the base portion of the clip. In the known clip, in order to increase the flexing range of the base portion of the clip, it is essential to increase a height of the clip (the base portion). However, the lamp unit for the vehicle may generally be subject to space restrictions. Therefore, the height of the clip can only be within a limited range. That is, the height of the clip cannot be unrestrictedly increased.

Thus, there is a need in the art for an improved clip.

SUMMARY

For example, in one aspect of the present disclosure, a clip for attaching an attaching article to an object member may include an engagement claw. The engagement claw may be configured to engage an attaching hole formed on the object member. The clip may also include a slide body configured to retainably hold the engagement claw on the attaching article and configured to slide the engagement claw with respect to the attaching article so as to project and retract the engagement claw. The clip may further includes an elastic body configured to apply a restoring force to the engagement claw when the engagement claw slides from a projected state to a retracted state with respect to the attaching article. The elastic body may be structured so as to return the engagement claw toward the projected state.

In another aspect of the present disclosure, the elastic body may be a pantograph type elastic body. Further, a first axis of the attaching hole and a second axis of the pantograph type elastic body may be configured to be parallel to each other.

In another aspect of the present disclosure, an attachment structure of an attaching article may be configured to attach an object member. In the attachment structure, the attaching article is retainably provided with an engagement claw configured to engage an attaching hole formed on the object member and configured to project and retract with respect to the attaching article. The engagement claw is configured to be introduced into the attaching hole while retracting. The retracted engagement claw projects due to a restoring force of an elastic body and engages a periphery of the attaching hole.

Other objects, features, and advantages of the present disclosure will be readily understood after reading the following detailed description together with the accompanying drawings and the claims.

BRIEF DESCRIPTION OF THE DRAWINGS

FIG. 1 illustrates a condition before the clip is attached to the lamp unit.

DETAILED DESCRIPTION

Detailed representative embodiments of the present disclosure are shown in FIGS. 1 to 17.

A first detailed representative embodiment of the present disclosure will be described with reference to FIGS. 1 to 9. The first embodiment may be directed to a clip 3 that is configured to be attached to an interior part or lamp unit 2 (which are embodiments of an attaching article) in order to attach the lamp unit 2 to an attaching hole 10 formed on a ceiling panel 1 (which is an embodiment of an object member) and having a central axis H1 (which is an embodiment of a first axis). Further, a longitudinal or front-back direction (forward and backward directions), a lateral direction (rightward and leftward directions), and a vertical direction (upward and downward directions) described herein are with reference to FIG. 1 and are only for the purpose of convenience. These directions are not intended to limit the disclosure.

Figure 2:
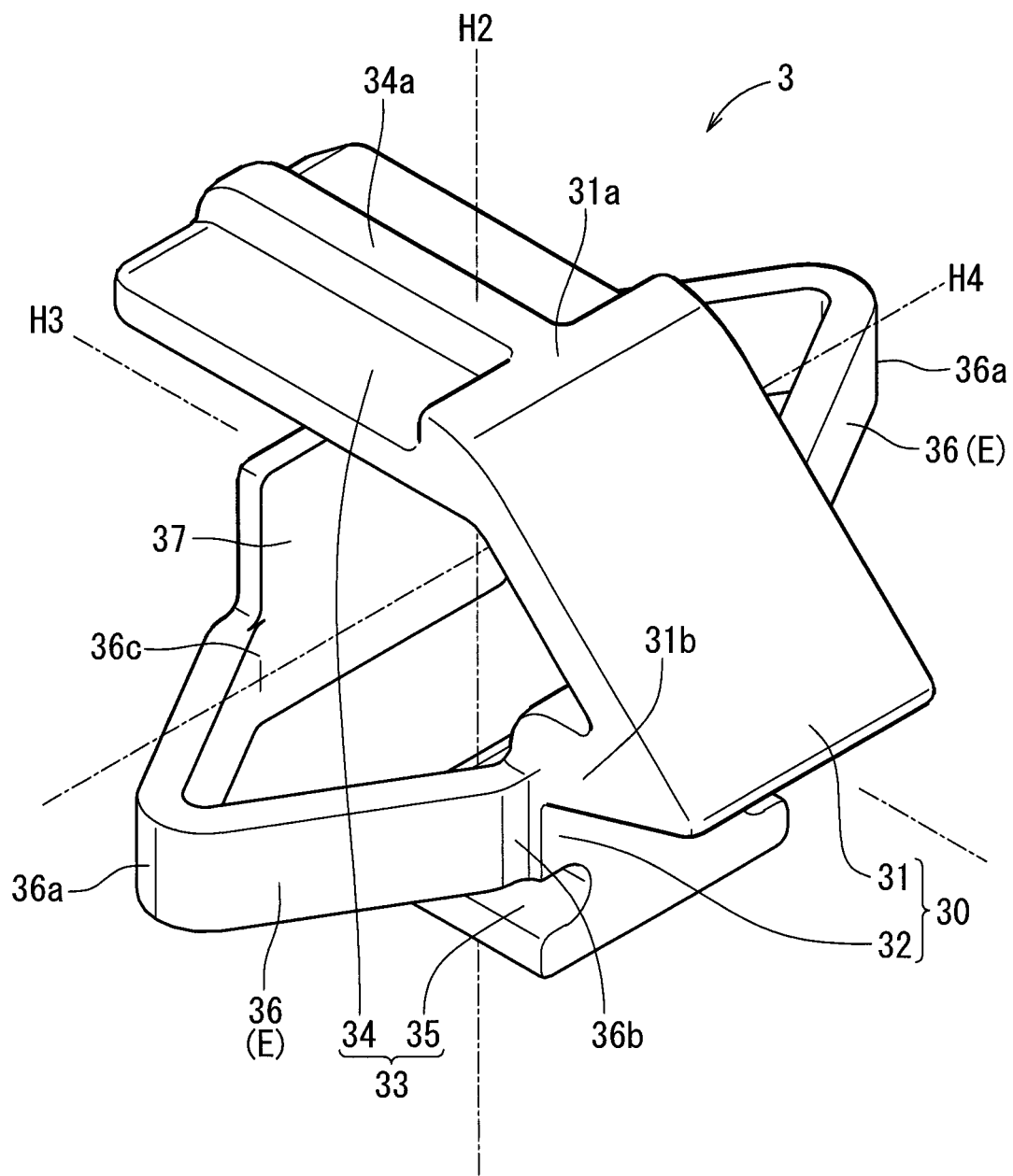
FIG. 2 is an enlarged perspective view of the clip of FIG. 1.
Figure 3:
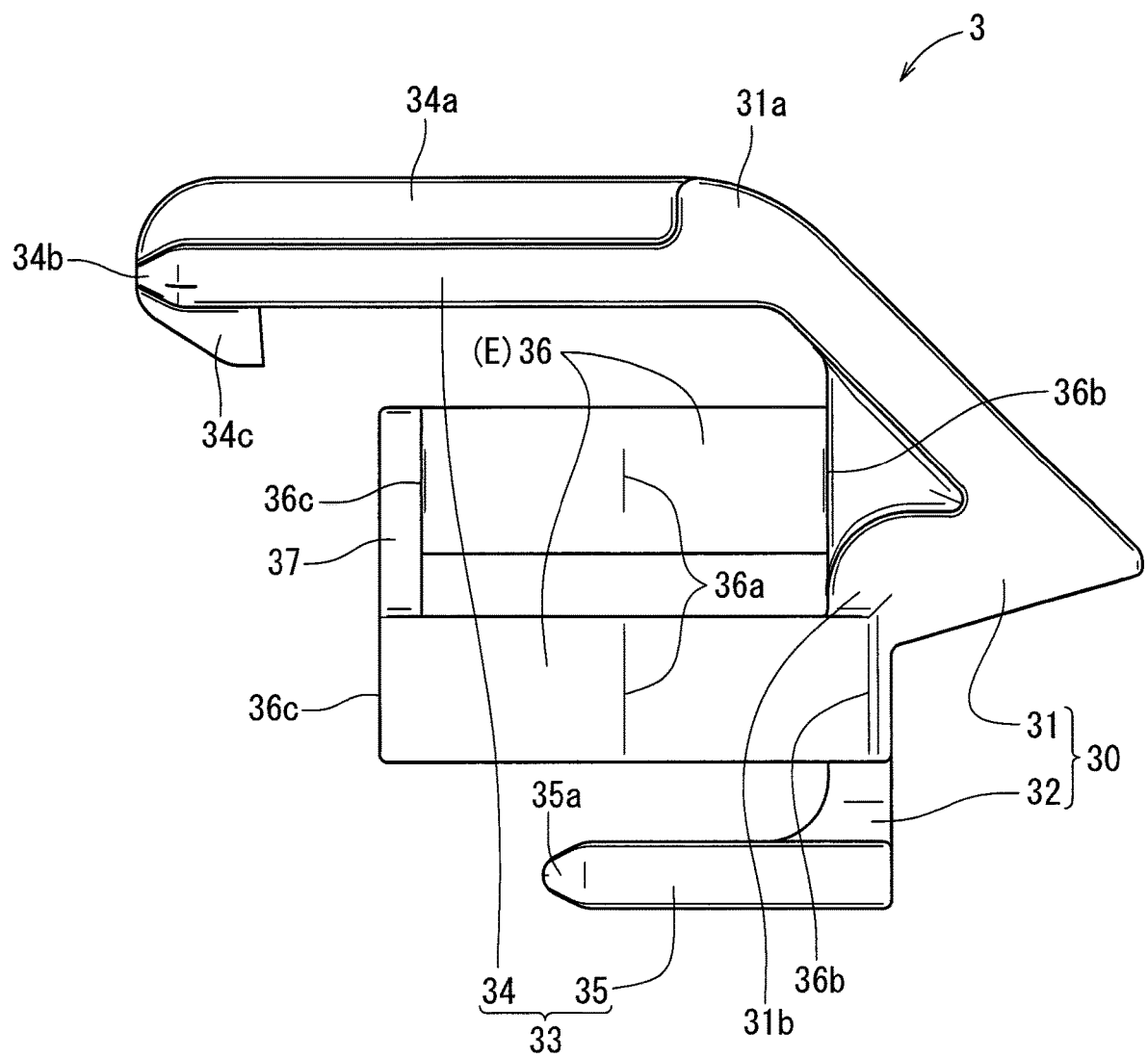
FIG. 3 is a side view of the clip shown in FIG. 2.

The clip 3 may be formed as an integrally formed article of a rigid synthetic resin, e.g., polypropylene (PP). As shown in FIGS. 2 to 5, the clip 3 may include an engagement body 30, a slide body 33, an elastic body E, and a plate-shaped clip base 37. The clip base 37 may be oppositely positioned behind the engagement body 30. As shown in FIGS. 2 and 3, the engagement body 30 may include a wedge-shaped engagement claw 31 projecting forward. The engagement body 30 may also include a vertical wall portion 32 formed on a lower end 31b of the engagement claw 31 and extending downward therefrom.

As shown in FIGS. 2 and 3, the slide body 33 may include a pair of elongated slide plates, i.e., an upper slide plate 34 (which is an embodiment of a first slide plate) formed on an upper end 31a of the engagement claw 31 and a lower slide plate 35 (which is an embodiment of a second slide plate) formed on a lower end of the wall portion 32. The upper and lower slide plates 34, 35 may be positioned parallel to each other. The upper slide plate 34 may horizontally extend backward (in a direction opposite to a projecting direction of the engagement claw 31) from the upper end 31a of the engagement claw 31. Conversely, the lower slide plate 35 may horizontally extend backward from the lower end of the wall portion 32. Further, the upper slide plate 34 may have a rib 34a formed on a widthwise central portion of an upper surface thereof, the rib 34a extending along such surface. Further, the upper slide plate 34 may have an engagement projection 34c formed on a lower surface of a rear end 34b thereof.

Figure 4:
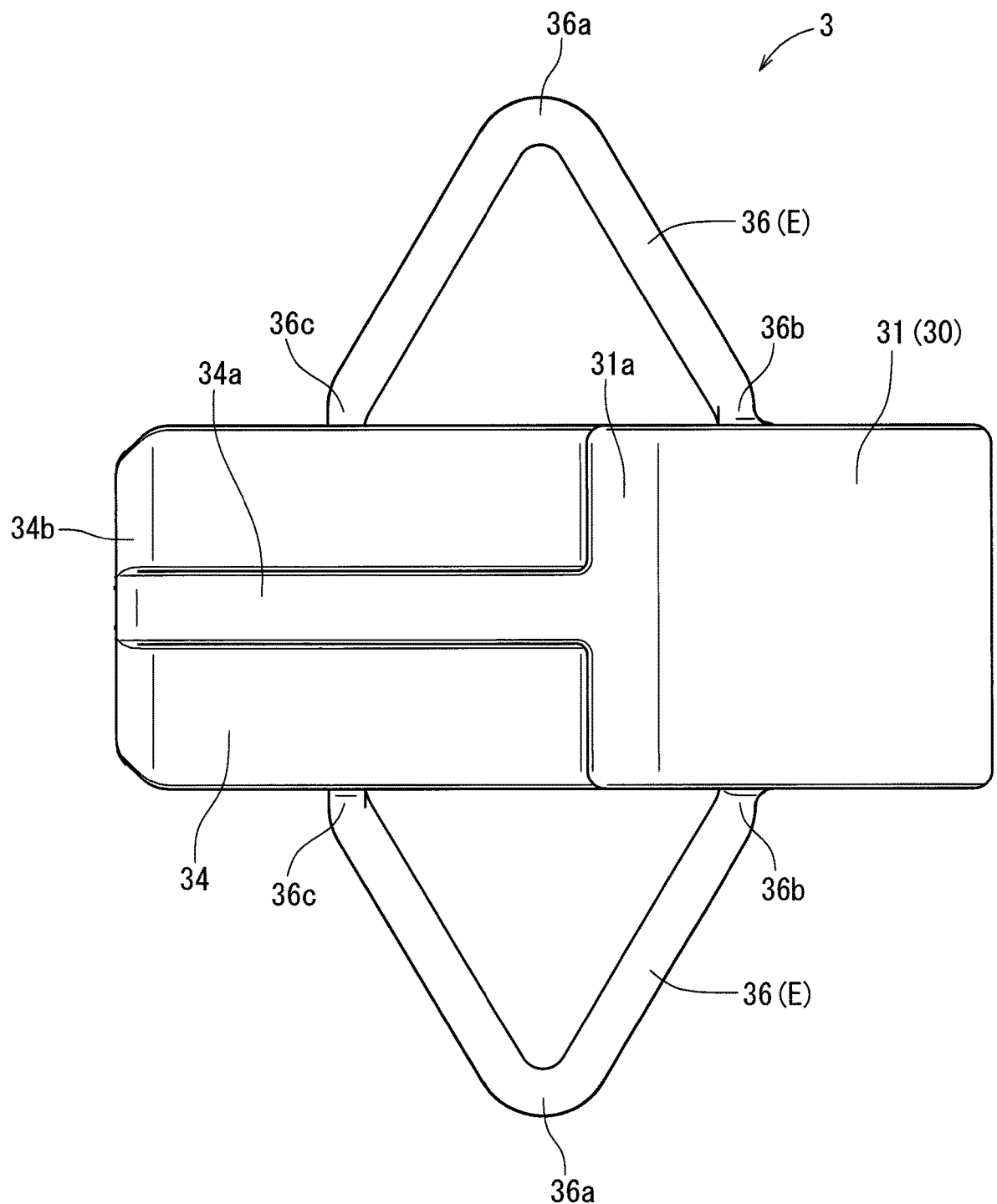
FIG. 4 is a plan view of the clip shown in FIG. 2.
Figure 5:
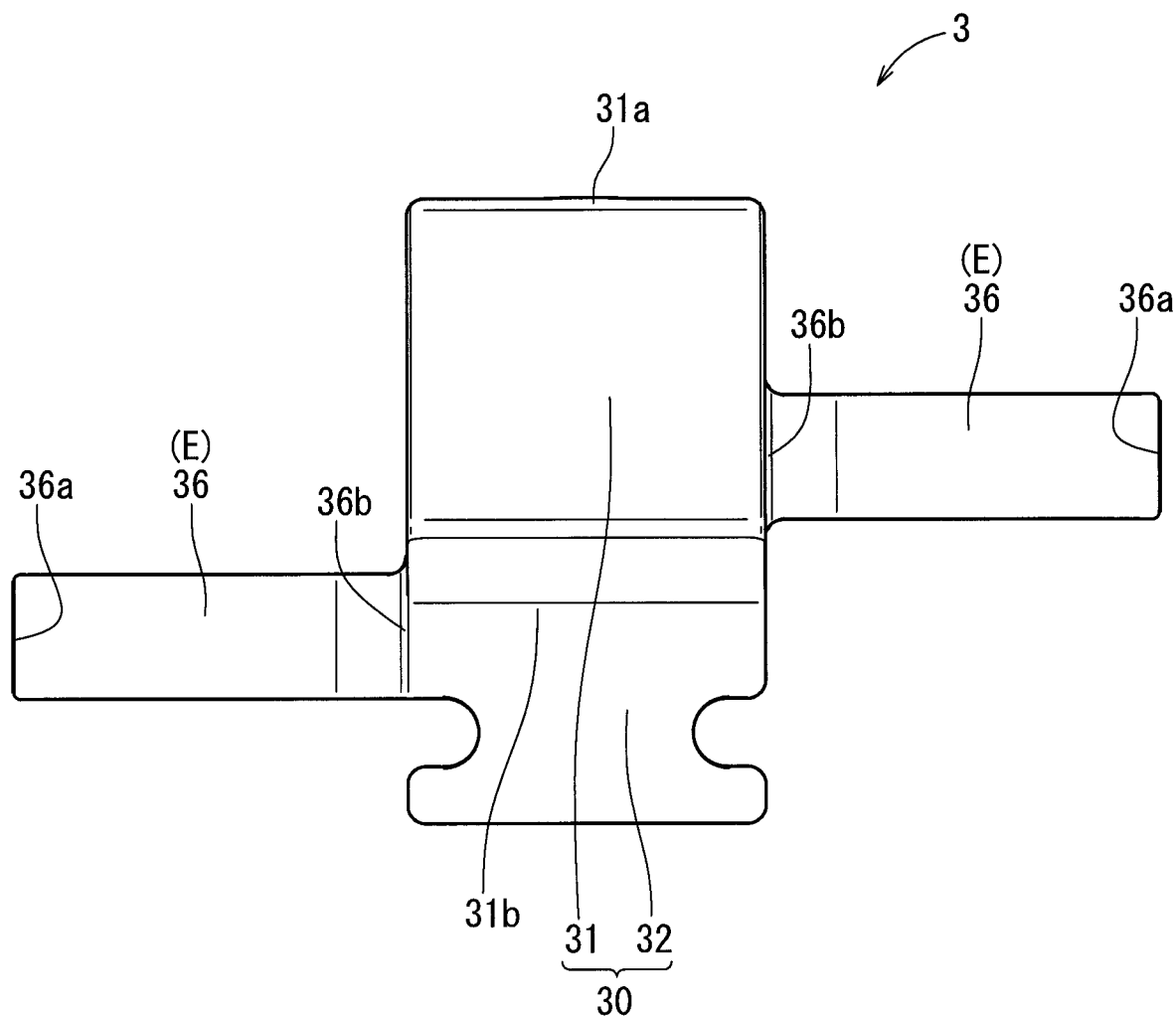
FIG. 5 is an elevational view of the clip shown in FIG. 2.

As shown in FIG. 2, the elastic body E may substantially be positioned between the upper slide plate 34 and the lower slide plate 35. As shown in FIGS. 2, 4, and 5, the elastic body E may include a pair of horizontally arranged V-shaped compressible or elastic elements 36, each having bent portions 36a. The elastic elements 36 may be laterally and oppositely arranged. The elastic elements 36 may be connected to each other at their first and second ends 36b, 36c (embodiments of which are front and rear ends) via the engagement body 30 and the clip base 37, respectively. The elastic elements 36, along with the engagement body 30 and the clip base 37, may be positioned and structured so as to be formed into substantially a rhomboid shape that is laterally largely projected. In particular, the first ends 36b of the elastic elements 36 may be connected to the wall portion 32 of the engagement body 30, while the second ends 36c of the elastic elements 36 may be connected to the clip base 37. Thus, the elastic body E may be formed as a horizontally arranged pantograph type elastic body having a vertical central axis H2 (which is an embodiment of a second axis), a longitudinal central axis H3, and a lateral central axis H4. As a result, the elastic body E may horizontally expand and contract back and forth while laterally moving the bent portions 36a of the elastic elements 36 toward and away from each other along the axis H4. As a result, the elastic body E may horizontally and elastically move (slide) the engagement body 30 (and accordingly the engagement claw 31) back and forth. Therefore, the axis H4 may be referred to as an elongation direction of the elastic body E. Further, the vertical central axis H2, the longitudinal central axis H3, and the horizontal central axis H4 of the elastic body E may respectively be referred to as a vertical central axis, a longitudinal central axis, and a lateral central axis of the clip 3.

Further, as shown in FIG. 3, the clip 3 may be configured such that the engagement projection 34c formed on the rear end 34b of the upper slide plate 34, the clip base 37, and a rear end 35a of the lower slide plate 35 are arranged in this order toward the engagement claw 31 along the longitudinal central axis H3.

Figure 1:
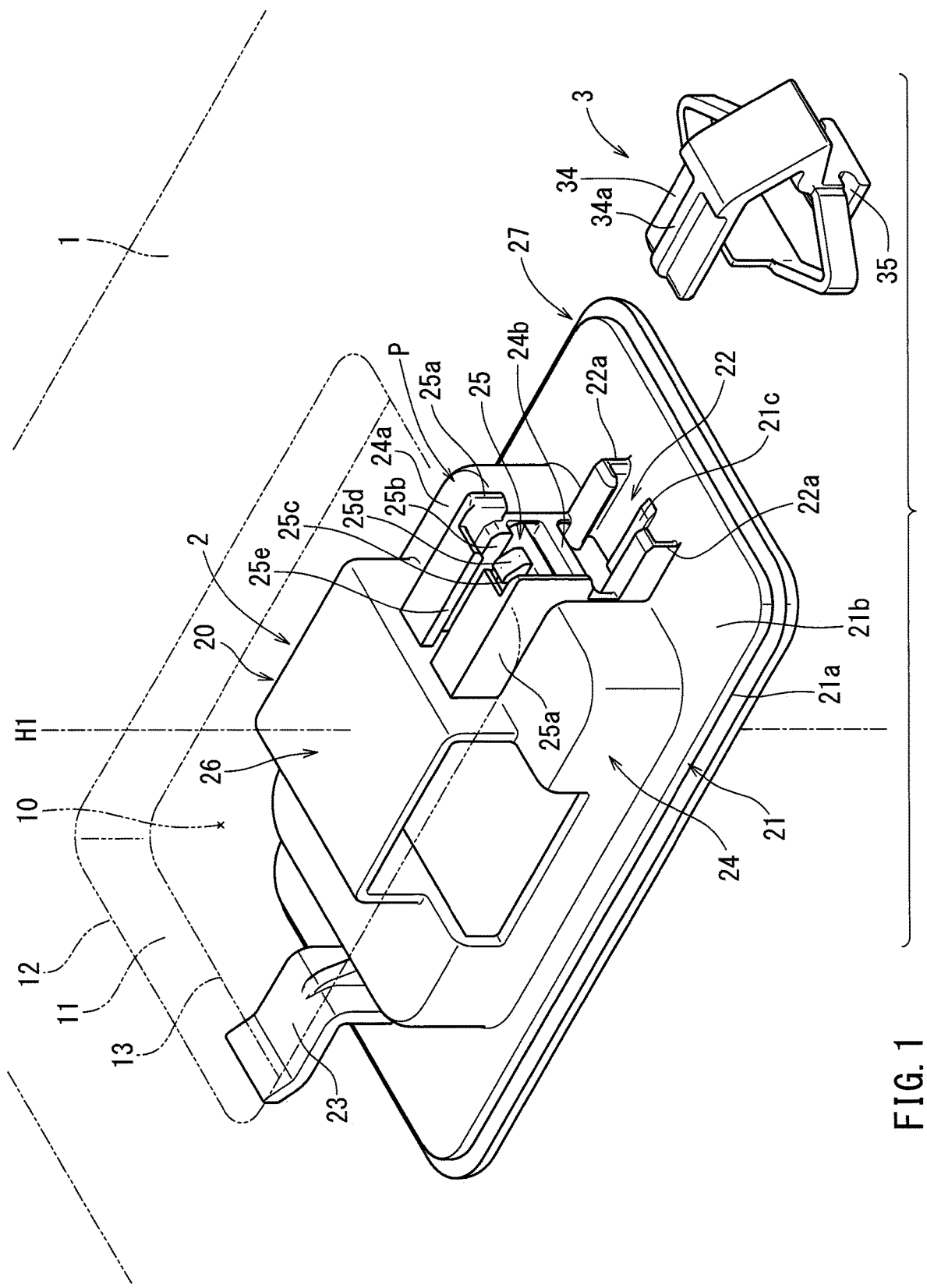
FIG. 1 is a perspective view of a clip and a lamp unit according to a first embodiment.

As shown in FIG. 1, the lamp unit 2, to which the clip 3 is to be attached, may include a lamp body 20 and a cover lens 27. The lamp body 20 may include a rectangular plate-shaped base or substrate 21, a substantially rectangular partially opened casing 24 (which is an embodiment of a first casing) formed on a rear or inner surface 21b of the substrate 21, and a rectangular open-ended casing 26 (which is an embodiment of a second casing) formed on the first casing 24. Further, the cover lens 27 may be attached to the substrate 21 so as to cover an outer surface 21a of the substrate 21.

As shown in FIG. 1, the substrate 21 may have a clip attachment P positioned on a front end (which is an embodiment of a first end) thereof. In particular, the clip attachment P may be formed on the inner surface 21b of the substrate 21 and may be configured such that the clip 3 may be attached thereto. The clip attachment P may include a lower attachment portion 22 (which is an embodiment of a first attachment portion) that is configured to (longitudinally) slidably receive the lower slide plate 35 of the clip 3. The clip attachment portion P may also include an upper attachment portion 25 (which is an embodiment of a second attachment portion) that is configured to (longitudinally) slidably receive the upper slide plate 34 of the clip 3. The lower attachment portion 22 may include a pair of elongated guide rails 22a (which is an embodiment of side walls) formed on the inner surface 21b of the substrate 21. The guide rails 22a may have an L-shaped cross section. The guide rails 22a may be laterally and oppositely positioned at a predetermined interval. The guide rails 22a thus positioned may allow the lower slide plate 35 of the clip 3 to slide therealong, so that the lower slide plate 35 may be introduced into the lower attachment portion 22. Further, the guide rails 22a may effectively prevent the lower slide plate 35 of the clip 3, once it has been introduced into the lower attachment portion 22, from disengaging therefrom in a vertical direction. This may be due to their special shape, i.e., the L-shaped cross-section.

Further, as shown in FIG. 1, the lower attachment portion 22 may include an elongated slide guide member 21c (which is an embodiment of a slide guide portion) formed on the inner surface 21b of the substrate 21. The slide guide member 21c may be positioned between and parallel to the guide rails 22a. The slide guide 21c may be structured such that the lower slide plate 35 of the clip 3 smoothly slides along the guide rails 22a.

As shown in FIG. 1, the upper attachment portion 25 may include a pair of elongated guide rails 25a (which may be an embodiment of side walls) formed on an upper surface 24a of the first casing 24, the guide rails 25a having an L-shaped cross-section. The guide rails 25a may be laterally oppositely positioned at a predetermined interval. The guide rails 25a thus positioned may allow the upper slide plate 34 of the clip 3 to slide therealong, so as to allow the upper slide plate 34 to be introduced into the upper attachment portion 25. Further, the guide rails 25a may effectively prevent the upper slide plate 34 of the clip 3, once it has been introduced into the upper attachment portion 25, from disengaging from the upper attachment portion 25 in the vertical direction, at least in part due to their special shape, i.e., the L-shape in cross section.

As shown in FIG. 1, the guide rails 25a may be configured to form a longitudinally elongated guide space 25e between upper longitudinal end surfaces thereof. The guide space 25e may be configured such that the rib 34a formed on the upper slide plate 34 of the clip 3 may slidably fit therein.

Further, as shown in FIG. 1, the upper attachment portion 25 may include elongated slide guide members 25b (which may be an embodiment of a slide guide portion) respectively formed on inner vertical surfaces of the guide rails 25a. The slide guide members 25b may be structured to allow the upper slide plate 34 of the clip 3 to smoothly slide along the guide rails 25a.

Figure 8:
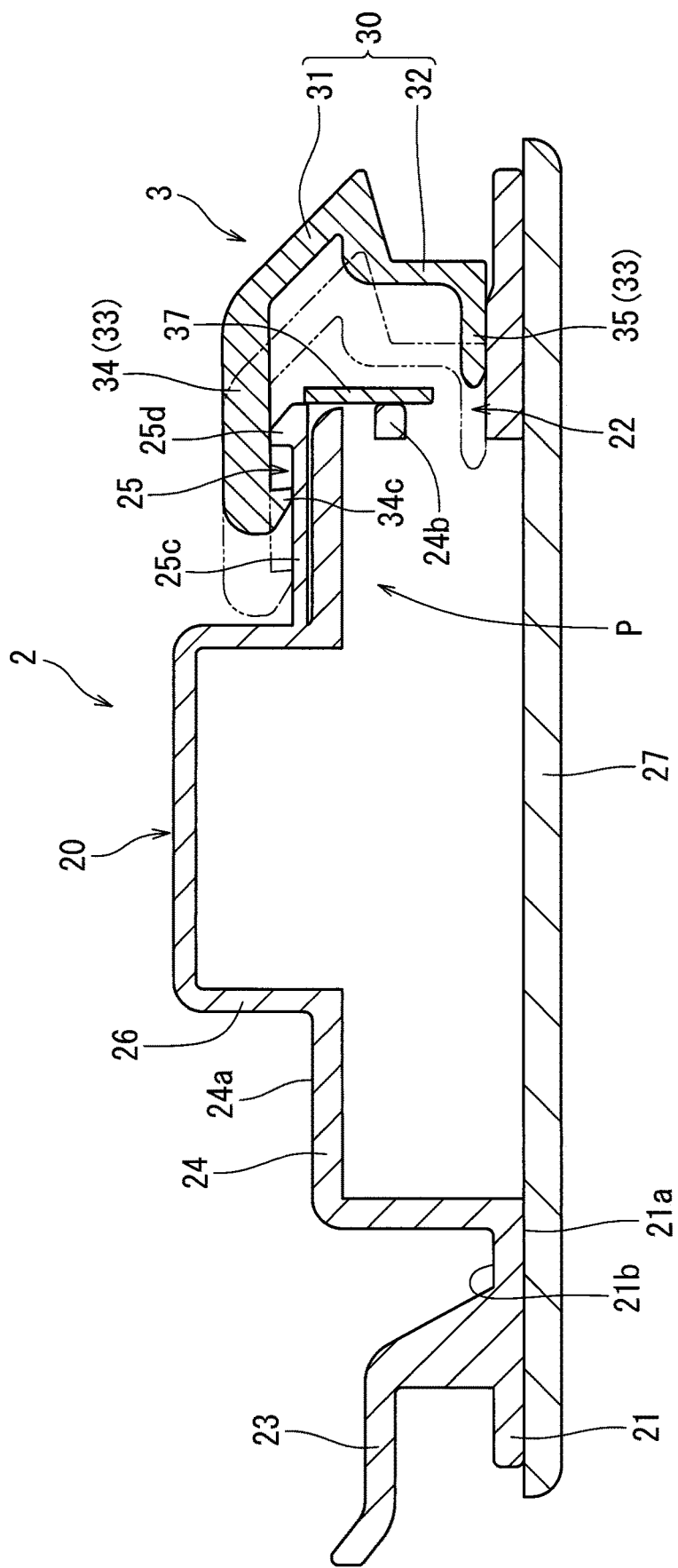
FIG. 8 is a cross-sectional view taken along line VIII-VIII in FIG. 6.
Figure 9:
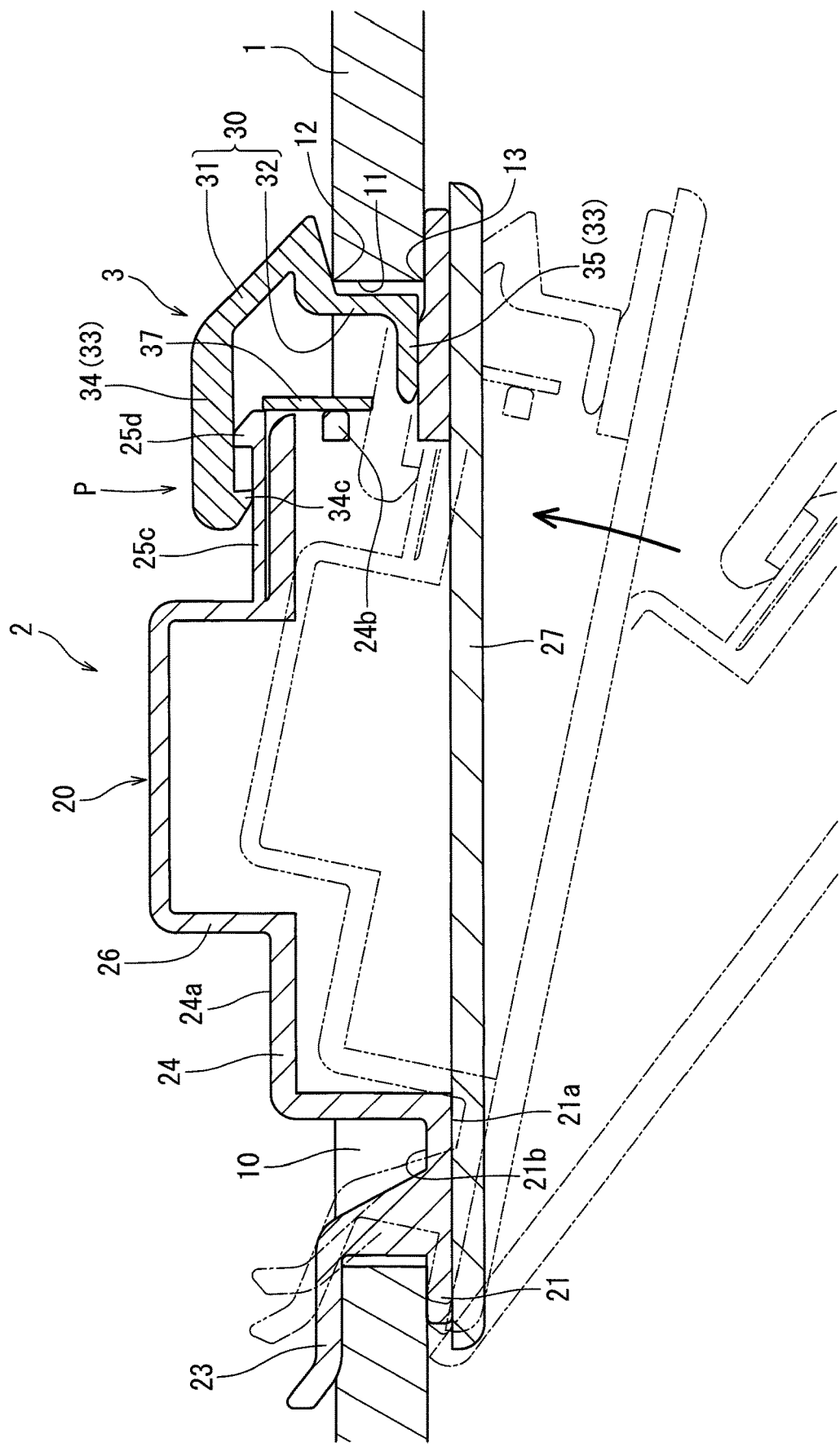
FIG. 9 is an explanatory cross-sectional view showing a process for attaching the lamp unit to a ceiling panel using the clip.

Further, as shown in FIGS. 1, 8, and 9, the upper attachment portion 25 may include an elongated flexible strip 25c formed on the second casing 26. The elongated flexible strip 25c may longitudinally project forward from the second casing 26. The flexible strip 25c may include an engagement projection 25d formed on a proximal end thereof. The engagement projection 25d of the flexible strip 25c may be configured to engage the engagement projection 34c formed on the upper slide plate 34 of the clip 3, so as to prevent the upper slide plate 34 of the clip 3 from being disengaged from the upper attachment portion 25 in a longitudinal direction.

As shown in FIGS. 1, 8, and 9, the clip attachment P may further include a transversely elongated vertical contact wall 24b (which is an embodiment of a stopper or attachment base) formed on the first casing 24. As shown in FIGS. 8 and 9, the contact wall 24b may be configured to contact the clip base 37 of the clip 3 once the clip 3 has been attached to the clip attachment P.

As shown in FIGS. 1, 8, and 9, the substrate 21 may be provided with an engagement strip 23 positioned on a rear end (which is an embodiment of a second end) thereof. In particular, the engagement strip 23 may be formed on the inner surface 21b of the substrate 21. The engagement strip 23 may be configured to be hooked on a periphery of the attaching hole 10 formed on the ceiling panel 1 when the lamp unit 2 is to be attached to the ceiling panel 1.

Further, the lamp unit 2 may further include a lamp, such as an LED lamp, a circuit board, and various electric devices, such as a switch (not shown), that are disposed in the first casing 24 and the second casing 26.

Next, a method of attaching the clip 3 to the lamp unit 2 will be described with reference to FIGS. 1 and 6 to 8. First, as shown in FIG. 1, the clip 3 may be positioned opposite to the lamp unit 2 while the upper slide plate 34 and the lower slide plate 35 are respectively and longitudinally aligned with the upper attachment portion 25 and the lower attach-ment portion 22 of the clip attachment P. Thereafter, the clip 3 may be pressed toward the clip attachment P. As a result, the upper slide plate 34 and the lower slide plate 35 may respectively be introduced and/or inserted into the upper attachment portion 25 and the lower attachment portion 22. This may be done while the flexible strip 25c is flexed due to contact of its engagement projection 25d with the engagement projection 34c formed on the upper slide plate 34. At this time, the upper slide plate 34 and the lower slide plate 35 may respectively be guided by the guide rails 25a formed on the upper attachment portion 25 and the guide rails 22a formed on the lower attachment portion 22.

Figure 6:
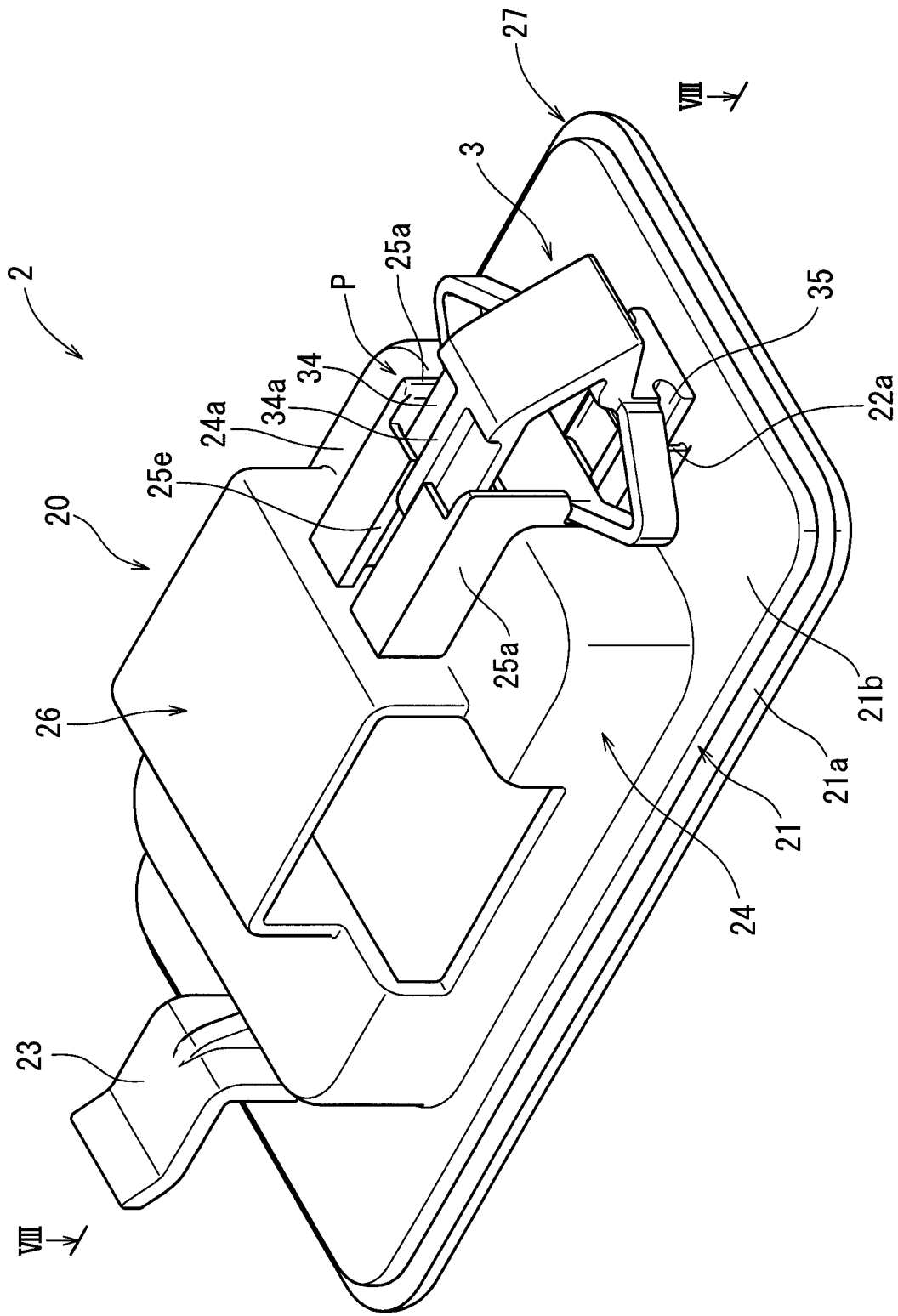
FIG. 6 is a perspective view of the clip and the lamp unit, which illustrates a condition in which the clip is attached to the lamp unit.
Figure 7:
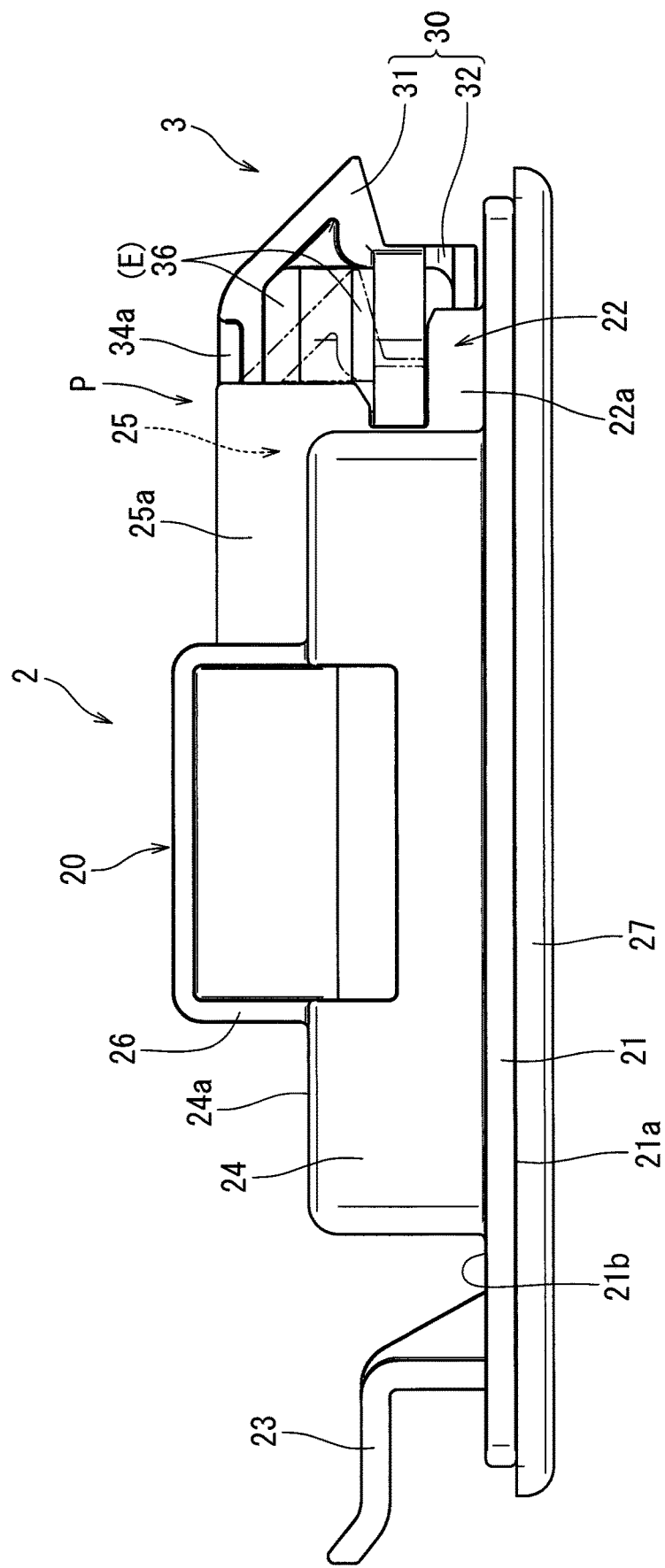
FIG. 7 is a side view of the lamp unit and attached clip shown in FIG. 6.

As shown in FIGS. 6 to 8, when the upper slide plate 34 and the lower slide plate 35 are further inserted into the upper attachment portion 25 and the lower attachment portion 22, the engagement projection 34c of the upper slide plate 34 may travel over the engagement projection 25d of the flexible strip 25c and the flexible strip 25c may be elastically restored. As a result, the upper slide plate 34 and the lower slide plate 35 may respectively be slidably coupled to the upper attachment portion 25 and the lower attachment portion 22. In this configuration, the elastic body E may be positioned in parallel with the inner surface 21b of the substrate 21 of the lamp body 20. Further, in such a coupling condition, the upper slide plate 34 and the lower slide plate 35 may respectively be prevented from being decoupled or removed from the upper attachment portion 25 and the lower attachment portion 22. This may be at least in part due to the interference of the engagement projection 34c of the upper slide plate 34 with the engagement projection 25d of the flexible strip 25c. That is, the upper slide plate 34 and the lower slide plate 35 may respectively be unremovably and/or retainably coupled to the upper attachment portion 25 and the lower attachment portion 22. As a result, the elastic body E may be held on the inner surface 21b of the substrate 21. In other words, the engagement body 30 (and accordingly the engagement claw 31) connected to the elastic body E may be retainably attached to and/or held on the substrate 21 of the lamp body 20, so as to slide (project and retract) with respect to the lamp body 20.

Thus, the clip 3 may be attached and/or connected to the clip attachment P of the lamp unit 2 via the slide body 33 (which may include the upper slide plate 34 and the lower slide plate 35), such that the elastic body E (which may include the elastic elements 36) is horizontally directed. That is, the clip 3 may be attached to the lamp unit 2 in such a manner that the elastic body E may horizontally expand and contract back and forth within a plane parallel to the inner surface 21b of the substrate 21 of the lamp body 20. Accordingly, the engagement claw 31 (and the engagement body 30) may project and retract between a projected state and a retracted state with respect to the lamp unit 2. Further, the clip 3 thus attached may be prevented from being detached and/or removed from the clip attachment P. This is at least in part because the slide body 33 may be retainably coupled to the clip attachment P. That is, the clip 3 (which may include the engagement claw 31) may be retainably attached to the lamp unit 2 via the slide body 33.

Next, a method of attaching the lamp unit 2 to the ceiling panel 1 using the clip 3 will be described, with reference to FIG. 9. First, the lamp unit 2 provided with the clip 3 may be positioned below the ceiling panel 1. Subsequently, as shown by a dashed-dotted line in FIG. 9, the engagement strip 23 formed on the substrate 21 of the lamp body 20 may be hooked on the periphery of the attaching hole 10 of the ceiling panel 1. As such, the periphery of the attaching hole 10 may be positioned between the engagement strip 23 and the substrate 21.

Thereafter, as shown by a dashed two-dotted line in FIG. 9, the lamp unit 2 may be rotated upward about the engagement strip 23. This may be done until the engagement claw 31 contacts a lower edge 13 (which is an embodiment of an outer edge) of the periphery of the attaching hole 10. Subsequently, the lamp unit 2 may be simply pushed upward toward the ceiling panel 1. Consequently, the engagement claw 31 (and accordingly the engagement body 30) may be pressed backward (leftward in FIG. 9) by the lower edge 13 of the periphery of the attaching hole 10. This also causes the clip base 37 to be pressed toward the contact wall 24b. As a result, the engagement claw 31 may move backward and while it is being rotated upward. The engagement claw 31 moves backward while compressing the elastic body E (not shown in FIG. 9). At this time, the upper slide plate 34 and the lower slide plate 35 may respectively be introduced further into the upper attachment portion 25 and the lower attachment portion 22. Thereafter, when the engagement claw 31 clears the lower edge 13 of the attaching hole 10, the engagement claw 31 may move upward along an inner surface 11 of the periphery of the attaching hole 10 with the elastic body E being compressed.

When the engagement claw 31 passes through the attaching hole 10, the engagement claw 31 may be pressed forward (rightward in FIG. 9) by an elastic or restoring force of the elastic body E. This causes the engagement claw 31 to move or project forward with respect to the lamp body 20. As a result, the engagement claw 31 may elastically engage an upper edge 12 (which is an embodiment of an inner edge) of the periphery of the attaching hole 10. The engagement of the engagement claw 31 may cause the substrate 21 of the lamp body 20 to be pressed to the ceiling panel 1 (the state of which is shown by a solid line in FIG. 9). That is, the clip 3 may engage the ceiling panel 1 in a condition in which the periphery of the attaching hole 10 is clamped between the engagement claw 31 and the substrate 21. Thus, the lamp unit 2 may be attached to the ceiling panel 1 using the clip 3.

Further, in order to remove or detach the lamp unit 2 from the ceiling panel 1, the wall portion 32 of the engagement body 30 may be simply pressed backward against the restoring force of the elastic body E. This may be done until the engagement claw 31 disengages from the upper edge 12 of the periphery of the attaching hole 10. This may allow the lamp unit 2 to be rotated downward about the engagement strip 23. Thus, the lamp unit 2 may be detached from the ceiling panel 1.

According to the embodiment, the clip 3 may be attached to the lamp unit 2 such that the elastic body E may horizontally expand and contract within the plane parallel to the inner surface 21b of the substrate 21 of the lamp body 20. Therefore, a flexing range of the elastic body E (including the elastic elements 36) can be increased without increasing a height of the clip 3 (in particular the height of the elastic body E). Additionally, the restoring force of the elastic body E may be changed without needing to substantially increase the overall height of the clip 3 (i.e., in order to change an engagement force of the engagement claw 31).

Further, according to the above embodiment, the clip 3 may be attached to the clip attachment P of the lamp unit 2 in a condition in which the upper slide plate 34 and the lower slide plate 35 formed on the engagement body 30 may respectively be slidably coupled to the upper attachment portion 25 and the lower attachment portion 22. The upper slide plate 34 and the lower slide plate 35 may be slidably coupled while respectively being guided by the guide rails 25a formed on the upper attachment portion 25 and the guide rails 22a formed on the lower attachment portion 22. Therefore, when the elastic body E expands and contracts, the upper slide plate 34 and the lower slide plate 35 may smoothly slide back and forth, so that the engagement body 30 may linearly move back and forth with the upper slide plate 34 and the lower slide plate 35. As a result, the engagement claw 31 of the engagement body 30 may reliably engage the periphery of the attaching hole 10. Additionally, the engagement claw 31 may be structured such that it may be optionally disengaged from the attaching hole 10.

Next, a second detailed representative embodiment of the present disclosure will be described with reference to FIGS. 10 to 13. Similar to the first embodiment, the second embodiment may be directed to a clip 103 that is configured to be attached to an interior part or lamp unit 102 (which is an embodiment of an attaching article) in order to attach the lamp unit 102 to an attaching hole 10 formed on a ceiling panel 1 (which is an embodiment of an object member). However, the clip 103 of this embodiment is different from the clip 3 of the first embodiment in that the clip 103 of this embodiment may be configured to be integrated with the lamp unit 102. Further, because the second embodiment relates to the first embodiment, only the structure and elements that are different from the first embodiment will be explained in detail. Elements of the first and second embodiments that are substantially the same will be identified by the same reference numerals and a detailed description of such elements may be omitted or simplified.

Figure 10:
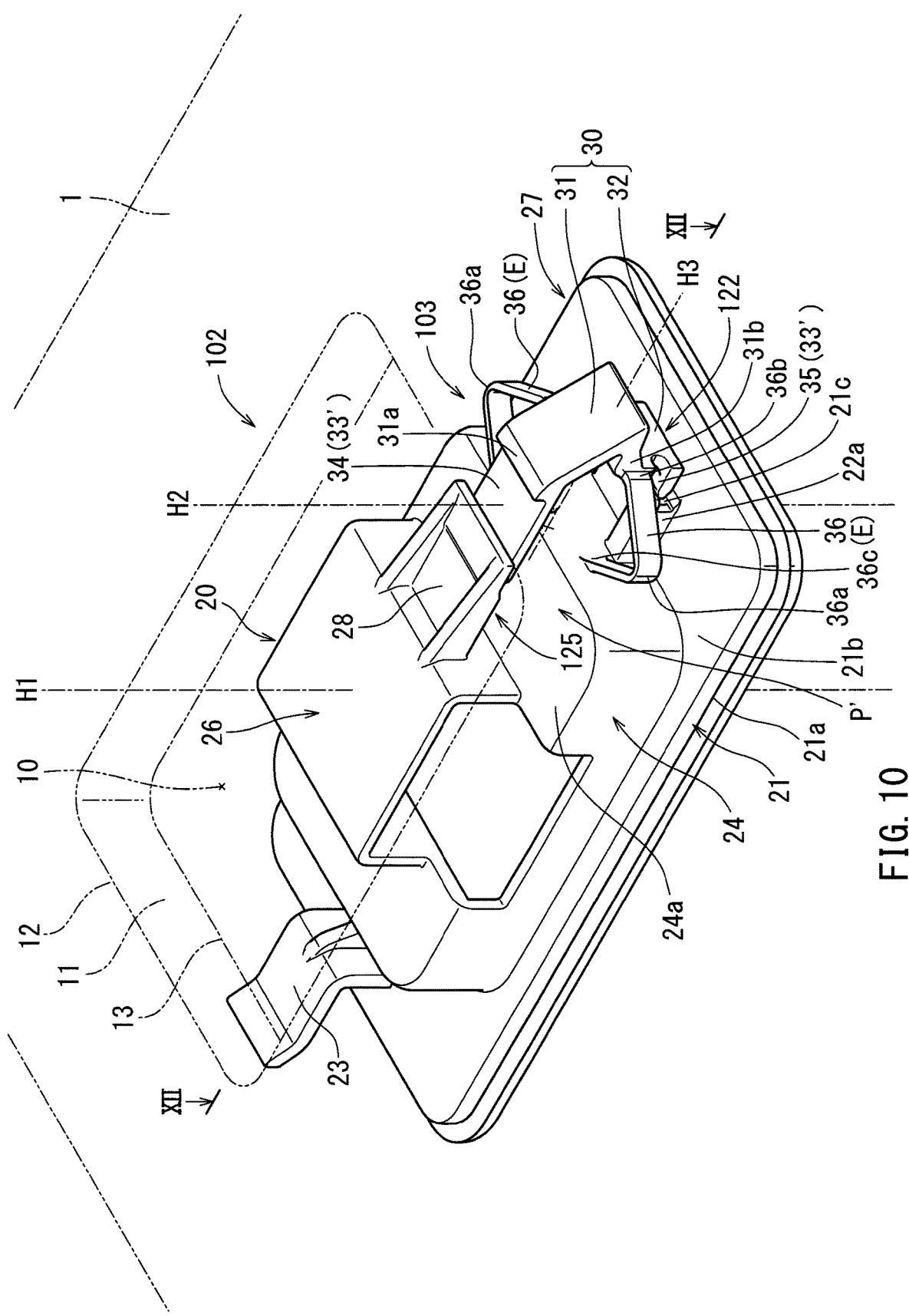
FIG. 10 is a perspective view of a clip and a lamp unit according to a second embodiment, in which the clip is integrated with the lamp unit.
Figure 11:
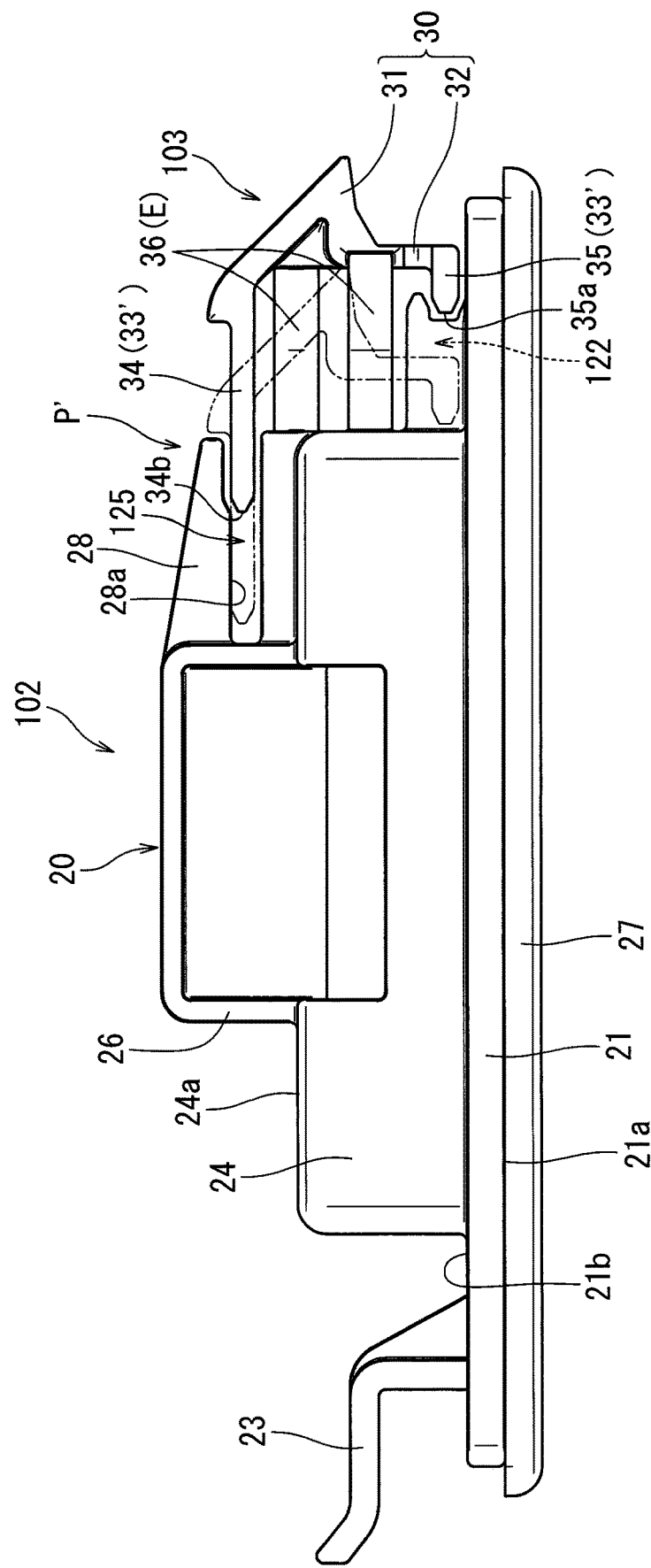
FIG. 11 is a side view of the lamp unit with the clip shown in FIG. 10.

In the clip 103 of this embodiment, the slide body 33 of the first embodiment may be replaced with a slide body 33' of the second embodiment. In particular, as shown in FIG. 11, unlike the slide body 33 of the first embodiment, the slide body 33' of the second embodiment omits a rib 34a and an engagement projection 34c formed on an upper slide plate 34 of the slide body 33'. Further, as shown in FIG. 10, the elastic body E may be slightly modified. For instance, while the first ends 36b of the elastic elements 36 may be connected to the wall portion 32 of the engagement body 30, the second ends 36c of the elastic elements 36 may not be connected to each other. In particular, unlike the first embodiment, the clip base 37 may be omitted in the second embodiment.

Figure 12:
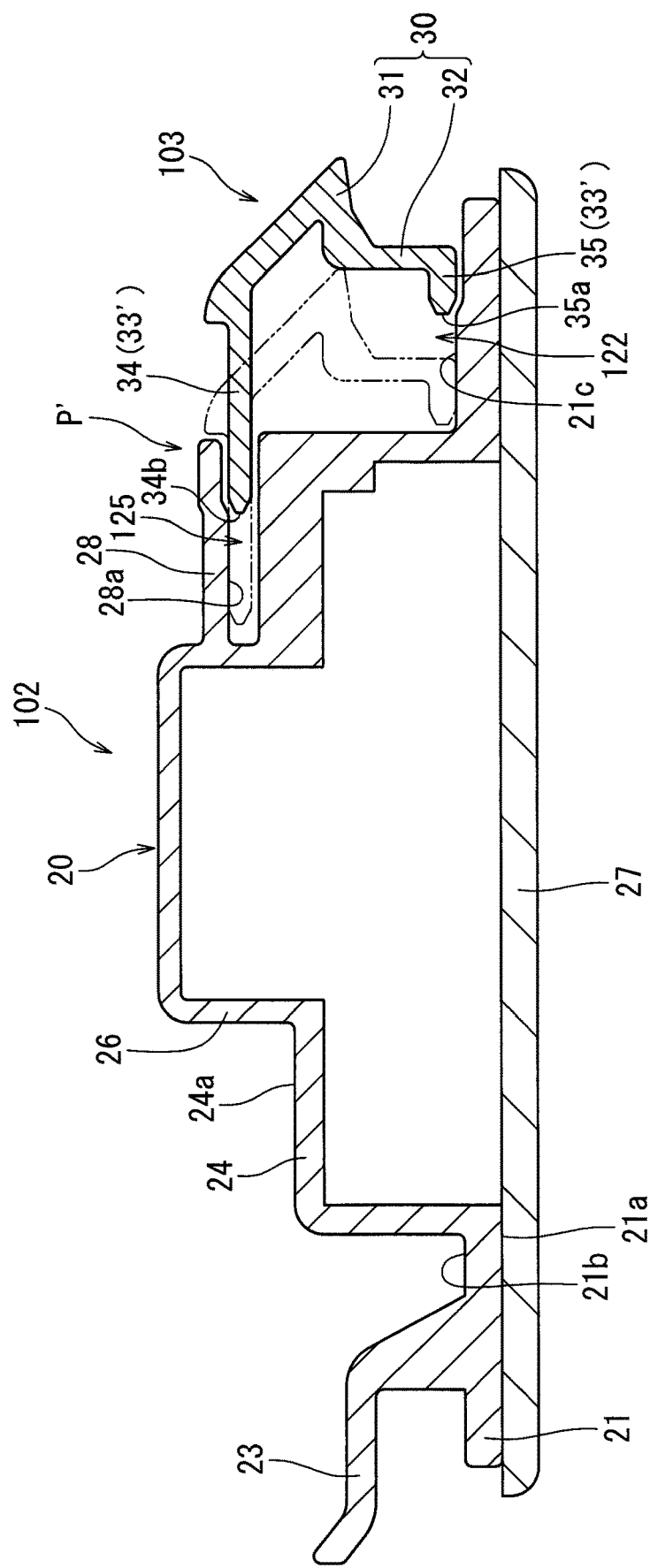
FIG. 12 is a cross-sectional view taken along line XII-XII in FIG. 10.

Furthermore, in the lamp unit 102 of this embodiment, the clip attachment P of the first embodiment may be replaced with a clip attachment P' of the second embodiment. The clip attachment P' the second embodiment may be different from the clip attachment P of the first embodiment in that the clip attachment P' of the second embodiment may include an upper attachment portion 125 (which is an embodiment of a second attachment portion) and a lower attachment portion 122, instead of the upper attachment portion 25 and the lower attachment portion 22 of the first embodiment. As shown in FIG. 10, the upper attachment portion 125 of this embodiment may include a guide plate 28, instead of the pair of guide rails 25a described in the first embodiment. The guide plate 28 may be horizontally formed on the second casing 26, so as to overhang the upper surface 24a of the first casing 24. As shown in FIGS. 11 and 12, the guide plate 28 may include an elongated slide guide portion 28a formed on a lower or inner surface thereof. Further, the flexible strip 25c formed on the second casing 26 of the first embodiment may be omitted from the upper attachment portion 125 of the second embodiment. Conversely, the lower attachment portion 122 of the second embodiment may have substantially the same structure as the lower attachment portion 22 of the first embodiment. Further, as shown in FIG. 10, the contact wall 24b formed on the first casing 24 of the first embodiment may be omitted from the clip attachment P' of the second embodiment.

As previously described, the clip 103 of the second embodiment may be configured to be integrated with the lamp unit 102. In particular, as shown in FIG. 10, the second ends 36c of the elastic elements 36 may be configured to be integrally connected to the first casing 24. That is, unlike the first embodiment, the elastic body E of the second embodiment may be directly held on the substrate 21, while the upper slide plate 34 and the lower slide plate 35 are partially introduced into the upper attachment portion 125 and the lower attachment portion 122. Thus, the clip 103 may be retainably attached to the clip attachment P' of the lamp unit 102 via the elastic body E. Further, similar to the first embodiment, the elastic body E may be formed as a horizontally arranged pantograph type elastic body. Accordingly, it may be configured to horizontally expand and contract back and forth in a condition in which the clip 103 is attached to the clip attachment P'.

Figure 13:
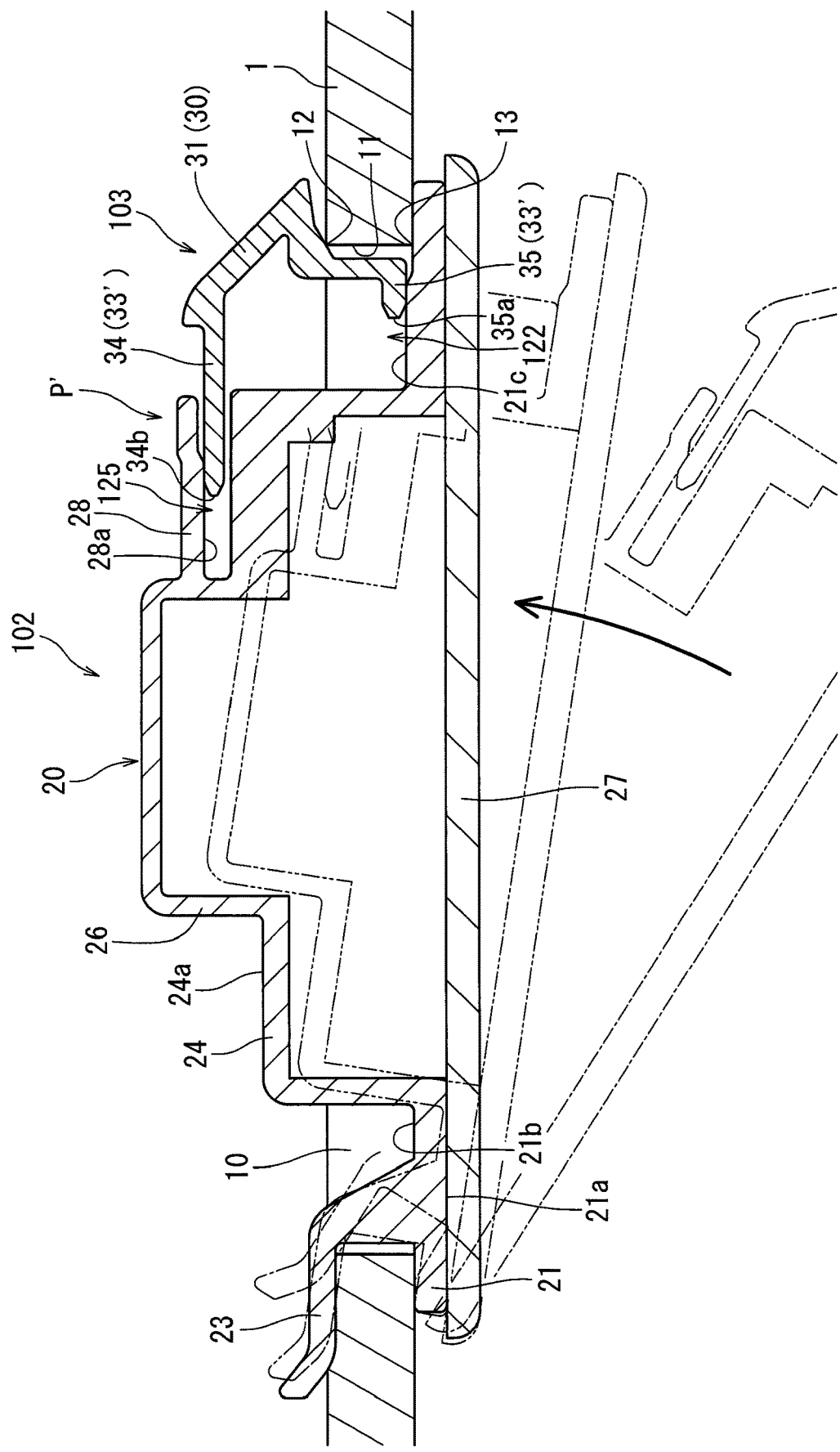
FIG. 13 is an explanatory cross-sectional view showing a process for attaching the lamp unit to a ceiling panel using the clip.

As shown in FIG. 13, the lamp unit 102 provided with the clip 103 may be attached to the ceiling panel 1 using the clip 103 in substantially the same manner as the lamp unit 2 of the first embodiment.

According to the above embodiment, the clip 103 may have substantially the same function as the clip 3 of the first embodiment. In particular, similar to the clip 3 of the first embodiment, a flexing range of the elastic body E of the second embodiment can be increased without increasing a height of the clip 103 (including the height of the elastic body E). Additionally, the restoring force of the elastic body E may be changed with increasing the height of the clip 103.

Next, a third detailed representative embodiment of the present disclosure will be described with reference to FIGS. 14 to 17. Similar to the second embodiments, the third embodiment may be directed to a clip 203 that is configured to be attached to an interior part or lamp unit 202 (which is an embodiment of an attaching article) in order to attach the lamp unit 202 to an attaching hole 10 formed in a ceiling panel 1 (which is an embodiment of an object member). Further, similar to the clip 103 of the second embodiment, the clip 203 of the third embodiment may be configured to be integrated with the lamp unit 202. Further, because the third embodiment relates to the second embodiment, only the structures and elements that are different from the second embodiment will be explained in detail. Elements of the second and third embodiment that are substantially the same will be identified by the same reference numerals and a detailed description of such elements may be omitted or simplified.

Figure 15:
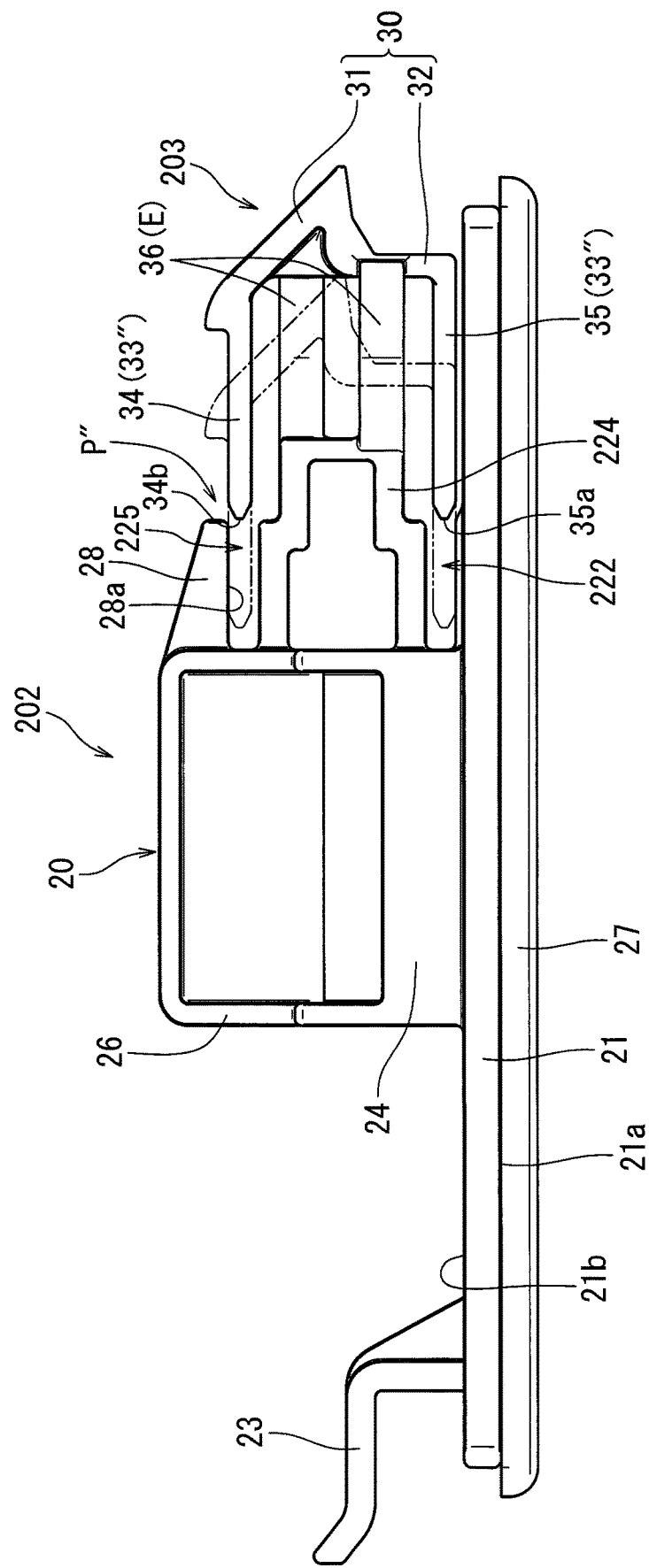
FIG. 15 is a side view of the lamp unit with the clip shown in FIG. 14.

In the clip 203 of this embodiment, the slide body 33' of the second embodiment may be replaced with a slide body 33" of the third embodiment. In particular, as shown in FIG. 15, the slide body 33" of the third embodiment may be different from the slide body 33' of the second embodiment in that the lower slide plate 35 of the slide body 33" of the third embodiment may be elongated backward so as to have substantially the same length as the upper slide plate 34.

Figure 14:
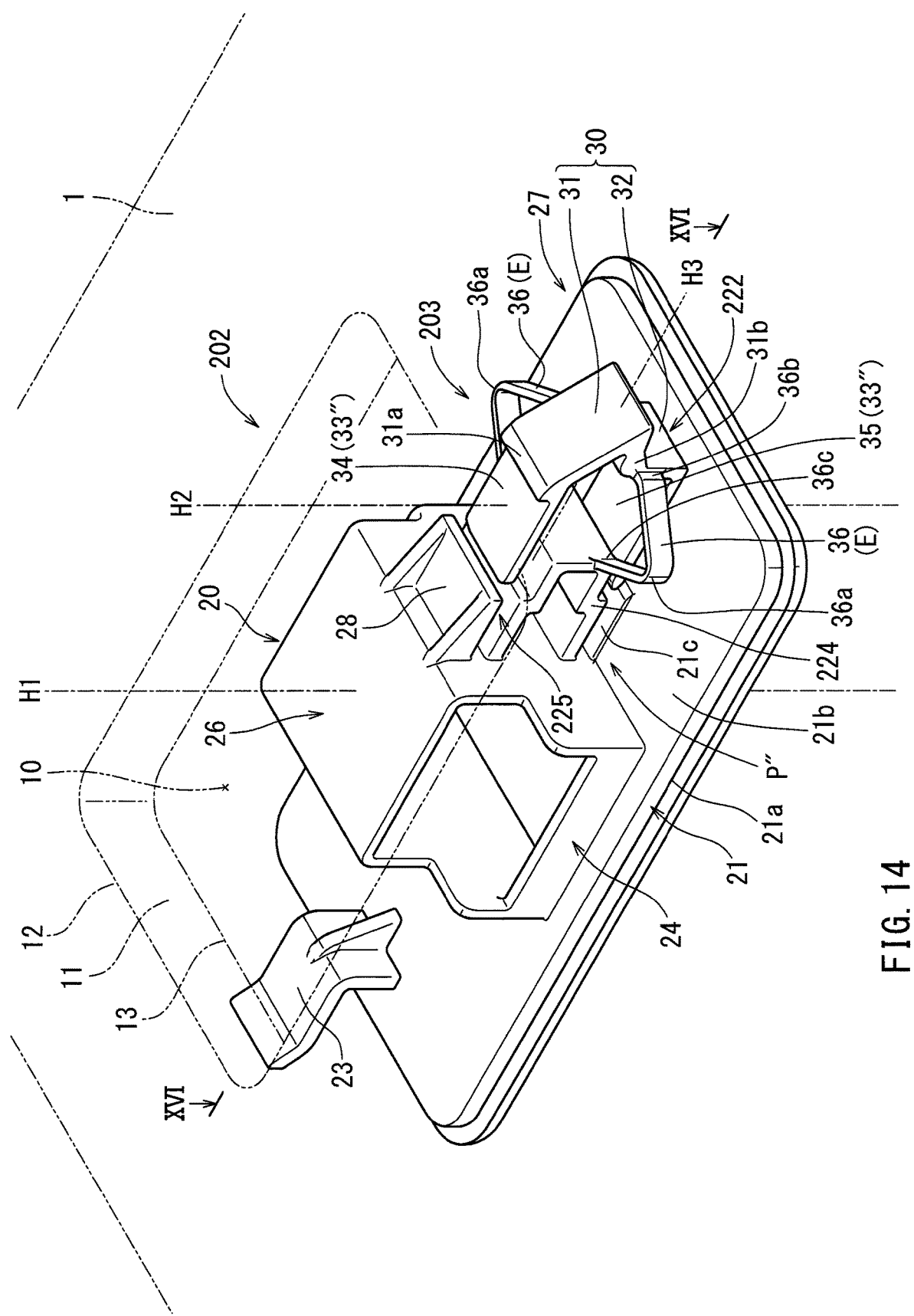
FIG. 14 is a perspective view of a clip and a lamp unit according to a third embodiment, in which the clip is integrated with the lamp unit.
Figure 16:
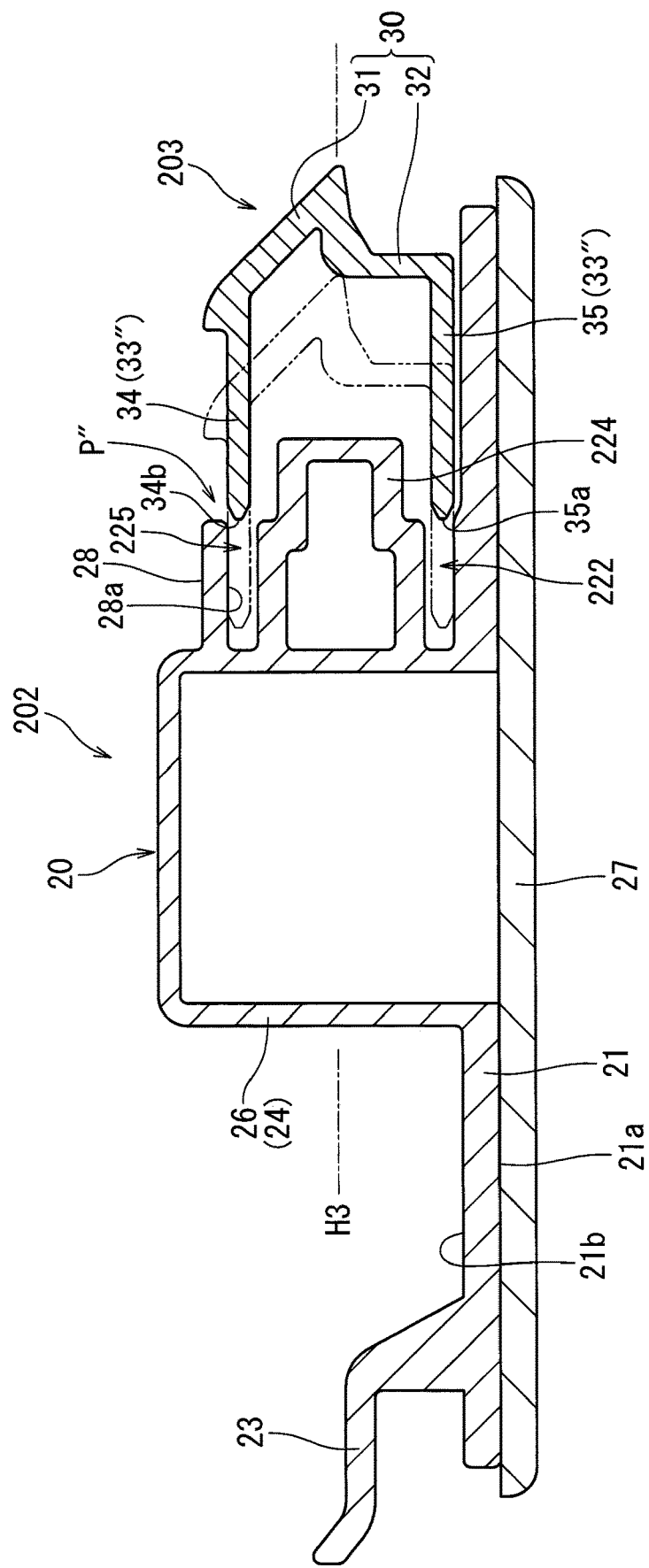
FIG. 16 is a cross-sectional view taken along line XVI-XVI in FIG. 14.
Figure 17:
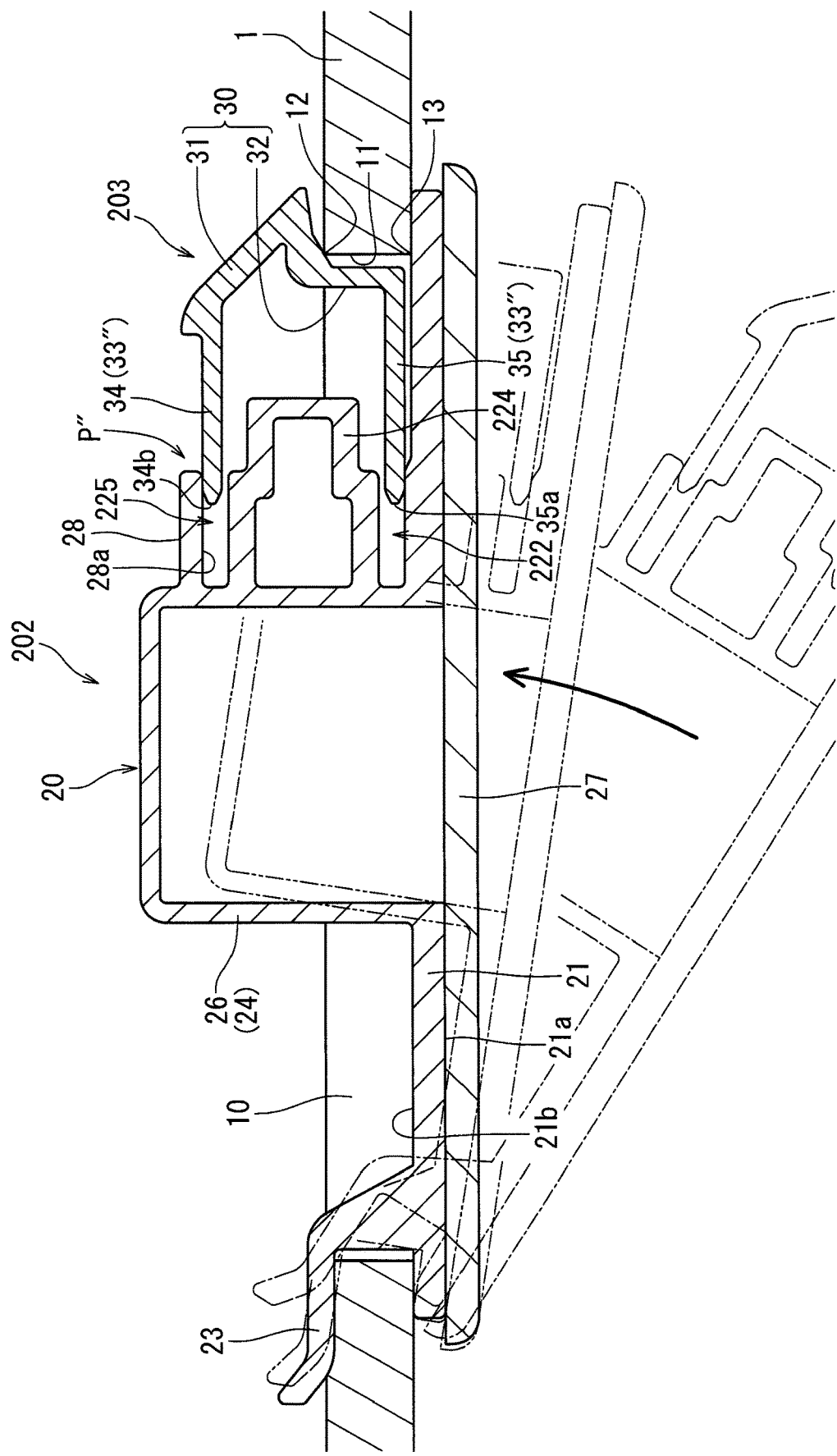
FIG. 17 is an explanatory cross-sectional view showing a process for attaching the lamp unit to a ceiling panel using the clip.

Conversely, as shown in FIG. 14, in the lamp unit 202 of this embodiment, the first casing 24 may be longitudinally shortened. The shortened first casing 24 may be provided with an attachment bracket 224 formed thereon and projecting forward therefrom. Further, the clip attachment P' of the second embodiment may be replaced with a clip attachment P''' of the third embodiment. The clip attachment P''' of the third embodiment may be different from the clip attachment P' of the second embodiment in that the clip attachment P''' of the third embodiment may include an upper attachment portion 225 (which may be an embodiment of a second attachment portion) and a lower attachment portion 222, instead of the upper attachment portion 125 and the lower attachment portion 122 of the second embodiment. In particular, as shown in FIGS. 15 to 17, unlike the second embodiment, the upper attachment portion 225 and the lower attachment portion 222 of the third embodiment may respectively be positioned above and below the attachment bracket 224. Further, as will become apparent from comparing FIG. 15 with FIG. 11, the upper attachment portion 225 of the third embodiment may substantially have the same structure as the upper attachment portion 125 of the second embodiment. However, the lower attachment portion 222 of the third embodiment may be different from the lower attachment portion 122 of the second embodiment in that the pair of guide rails 22a are omitted.

Similar to the clip 103 of the second embodiment, the clip 203 of the third embodiment may be configured to be integrated with the lamp unit 202. In particular, as shown in FIG. 14, the second ends 36c of the elastic elements 36 may be configured to be integrally connected to the attachment bracket 224. That is, similar to the second embodiment, the elastic body E of the third embodiment may be directly held on the substrate 21 of the lamp body 20, with the upper slide plate 34 and the lower slide plate 35 being partially introduced into the upper attachment portion 225 and the lower attachment portion 222. Thus, the clip 203 may be attached to the clip attachment P''' of the lamp unit 202 via the elastic body E.

As shown in FIG. 17, the lamp unit 202 may be attached to the ceiling panel 1 using the clip 203 in substantially the same manner as the lamp unit 102 of the second embodiment.

According to the above embodiment, the clip 203 may have substantially the same function as the clip 103 of the second embodiment. In particular, similar to the clip 103 of the second embodiment, a flexing range of the elastic body E can be increased without increasing a height of the clip 203 (the elastic body E) of the third embodiment. Additionally, the restoring force of the elastic body E of the third embodiment may be changed without increasing the height of the clip 203.

Naturally, various changes and modifications may be made to the present disclosure without departing from the scope of the disclosure. For example, in the first embodiment, the clip 3 is attached to the lamp unit 2 by the slide body 33. That is, the clip base 37 is not connected to the lamp unit 2. However, the clip base 37 may be connected to the lamp unit 2, so that the clip 3 is securely connected to the lamp unit 2. Further, in the second and third embodiments, the second ends 36c of the elastic elements 36 are integrally connected to the first casing 24 or the attachment bracket 224. However, the second ends 36c of the elastic elements 36 may be connected to the first casing 24 or the attachment bracket 224 using screws, rivets, or other such fasteners, as necessary.

Further, in the embodiments, the pantograph type elastic body is used as the elastic body E. However, the elastic body E may be various other types of elastic bodies, provided that such elastic bodies may be arranged so as to horizontally expand and contract within the plane parallel to the inner surface 21b of the substrate 21 of the lamp body 20.

Representative examples of the present disclosure have been described in detail with reference to the attached drawings. This detailed description is merely intended to teach a person of skill in the art further details for practicing preferred aspects of the present disclosure and is not intended to limit the scope of the disclosure. Only the claims define the scope of the claimed disclosure. Therefore, combinations of features and steps disclosed in the foregoing detail description may not be necessary to practice the disclosure in the broadest sense, and are instead taught merely to particularly describe detailed representative examples of the disclosure. Moreover, the various features taught in this specification may be combined in ways that are not specifically enumerated in order to obtain additional useful embodiments of the present disclosure.

What is claimed is:

1. An attachment structure of an attaching article for attaching the attaching article to an object member, comprising:
    an engagement claw configured to engage an attaching hole formed in the object member and configured to project and retract with respect to the attaching article,
    wherein the engagement claw is retainably provided on the attaching article,
    wherein the engagement claw is configured to be introduced into the attaching hole while retracting,
    wherein the retracted engagement claw is configured to project due to a restoring force of a pantograph type elastic body and is configured to engage a periphery of the attaching hole,
    wherein the elastic body includes a pair of V-shaped elastic elements each having a bent portion,
    wherein the pair of elastic elements are connected to each other at their first and second ends so as to be formed into substantially a rhomboid shape,
    wherein the engagement claw is provided with a pair of slide plates arranged such that the pantograph type elastic body is positioned therebetween, and
    wherein the attaching article is provided with a pair of slide guide portions that allow the slide plates to slide therealong.

2. The attachment structure as defined in claim 1, wherein a direction of the restoring force of the elastic body is perpendicular to a first axis of the attaching hole.

* * * * *